April 24, 1956    T. J. RHODES    2,742,669
EXTRUSION METHOD AND APPARATUS
Filed Feb. 17, 1951
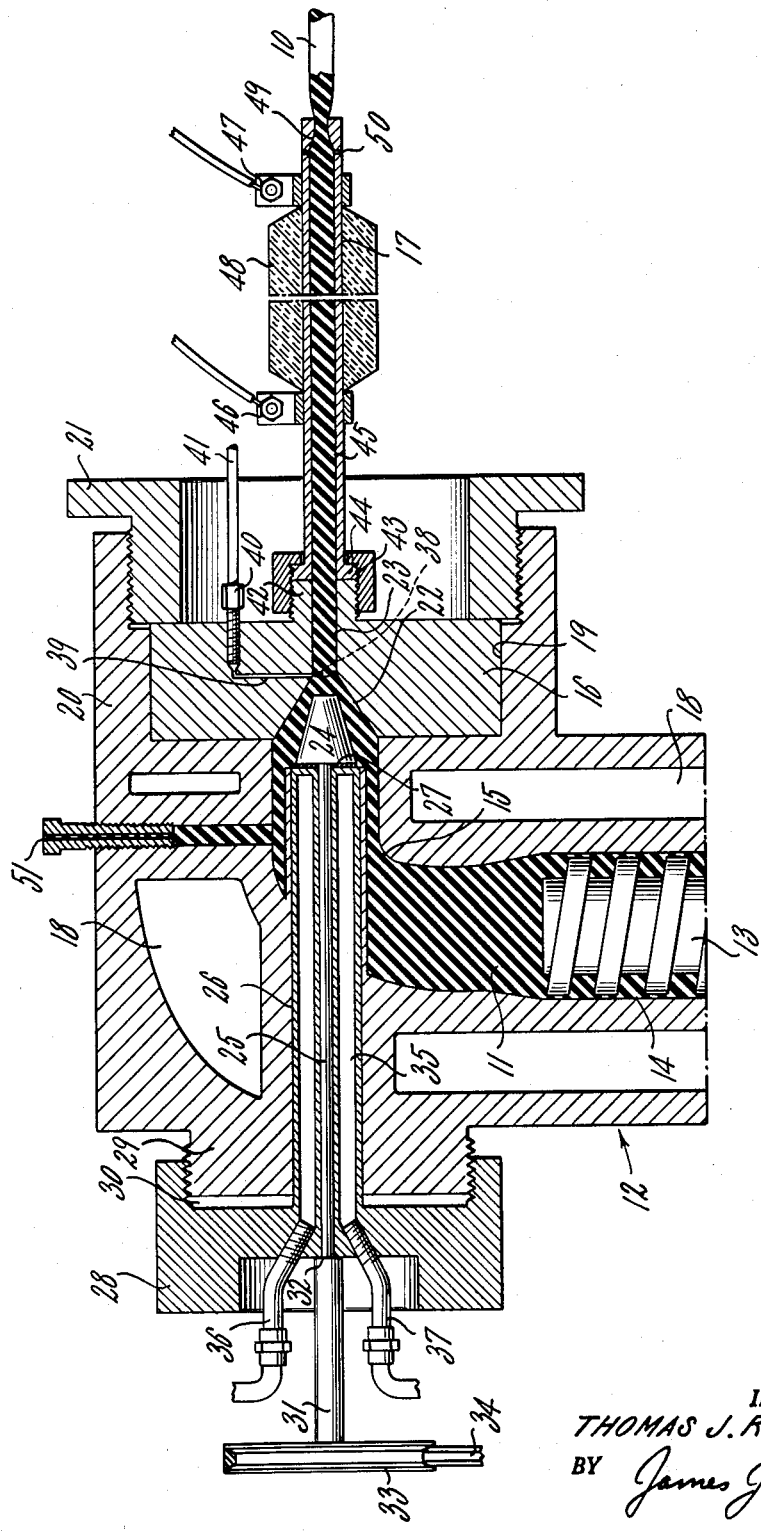
INVENTOR.
THOMAS J. RHODES
BY James J. Long
AGENT

United States Patent Office 2,742,669
Patented Apr. 24, 1956

2,742,669

EXTRUSION METHOD AND APPARATUS

Thomas J. Rhodes, Clifton, N. J., assignor to United States Rubber Company, New York, N. Y., a corporation of New Jersey Application February 17, 1951, Serial No. 211,510

7 Claims. (Cl. 18—12)

This invention relates to an extrusion method and apparatus for shaping plastic materials, and more particularly relates to a method and apparatus for advancing plastic material into a shaping chamber or passage and having a moving member for intensely working the plastic to raise the temperature of the plastic as it passes into the shaping chamber or passage.

One object of the invention is to provide a means for raising the temperature of an advancing plastic stream, such as a stream of rubber stock.

Another object of the invention is the provision of a means for rapidly heating a moving stream of viscous rubber stock or the like to a uniformly elevated temperature.

Still another object is to provide a heating means for raising the temperature throughout a mass of viscous plastic material in a relatively short time without any necessity for application of undesirably high surface temperatures to the plastic mass.

A further object of the invention is the provision of a method of heating heat sensitive plastic materials, especially vulcanizable rubber stock, to a uniformly elevated temperature in a relatively brief period of time without danger of scorching or pre-vulcanizing the plastic.

Still a further object is to provide a method for quickly bringing an advancing stream of vulcanizable rubber stock to vulcanizing temperatures, without danger of scorching the surfaces of the stock.

It is another object of the invention to provide a method for continuously vulcanizing rubber stocks while extruding the stock through an elongated confining and shaping chamber, which makes it possible to vulcanize the stock more quickly without danger of scorching it.

Additional objects and advantages of the invention will be made evident in the following detailed description, which is intended to be read with reference to the accompanying drawing, wherein the single figure is a plan view taken partly in longitudinal section and with parts broken away, of an apparatus constructed according to the invention.

The invention contemplates bringing a stream of moving viscous plastic material to a uniformly elevated temperature in a relatively short time by subjecting the plastic to intense mechanical working, whereby the temperature of the plastic is raised by conversion of the mechanical energy expended on the plastic into thermal energy, by reason of the relatively great internal friction of the viscous plastic. In a preferred embodiment of the invention, the plastic mass is vulcanizable rubber stock, and the stock is continuously vulcanized in the desired shape by advancing or extruding the stock through an elongated die or shaping chamber, in which the stock is heated at vulcanizing temperature while confined under pressure in the desired shape, and a thin film of lubricant is continuously applied between the internal walls of the confining die and the surface of the rubber stock to prevent sticking of the stock. At the entrance to the confining die, there is provided a moving member, such as a rotary plug, along the surface of which the rubber stock moves as it is advanced into the die. This moving surface serves to perform mechanical work on the rubber stock; for example, the moving surface in the form of a plug may be rotated at a relatively high speed, causing the viscous stock to be turbulently agitated or churned and generating considerable heat therein. The rubber is in this manner heated substantially to vulcanizing temperature in the short time, say a fraction of a second, that it takes for the rubber to pass by the plug, and the rubber is then ready for vulcanization as it enters the heated confining die.

Referring to the drawing, the embodiment of the invention shown therein is adapted to forming continuous lengths of shaped vulcanized rubber articles, in this case a vulcanized rubber rod 10, such as might be used for weather stripping, gaskets, or the like. For this purpose vulcanizable rubber stock 11 is delivered continuously from an extruder 12 under the influence of a rotating screw 13 within the extruder barrel 14, through an angular passage 15, or a crosshead passage, of the extruder into a preliminary shaping die 16, and then into an elongated shaping and confining die or vulcanizing tube 17. It will be understood that the extruder 12 is provided with the usual entrance hopper (not shown) into which the rubber stock is fed, as well as a suitable driving mechanism (not shown) for rotating the screw 13 to continuously advance the rubber under pressure. The body of the extruder is provided with the usual hollow chambers 18 through which a suitable heating medium, such as steam, is circulated to warm the rubber stock so it is in a more plastic and workable condition.

The preliminary shaping die 16 fits into a corresponding recess 19 in the head 20 of the extruder, and is held in place therein by a bushing 21 threaded into the head. The die has a central passageway comprising a forwardly tapered bushing 22 forming a continuation of the angular extrusion passage 15 leading from the extruder chamber, and a straight portion 23 having essentially the cross-sectional size and circular shape of the desired rubber rod 10. A frustro-conical rotary plug or core 24, coaxial with the terminal portion of the angular passage 15 and with the die passage 22, extends from the passage 15 into the die passage 22, thereby defining with the walls of the passages 15 and 22 an annular passageway through which the rubber stock is forced by the extruder screw 13. The rotary plug is mounted on the end of a shaft 25 passing transversely of the extruder to the rear of the cross-head 20, and rotates within a surrounding non-rotating sleeve member 26 that passes into the rear of the extruder head and extends into the cross-head passage 15. The forward face of the sleeve 26 is provided with a washer 27 of a suitable bearing material against which the rear surface of the rotary plug 24 bears. The rear of of the sleeve 26 is integral with a cap portion 28 which is screw-threadedly mounted on an exteriorly threaded cylindrical extension 29 from the rear of the cross-head 20. A clearance space 30 between the rear face of the extension 29 and the inner face of the cap 28 permits axial adjustment of the position of the cap and attached parts with respect to the extrusion head, by threading the cap inwardly or outwardly on the threaded extension 29. In this way the cross-section of the passage 22 between the rotor plug 24 and the die block may be adjusted to provide the desired clearance.

The rear end of the shaft 25 extends from the sleeve 26 and is threaded into, or otherwise secured to, a shaft extension 31 of larger diameter, which forms a shoulder 32 that bears against the rear surface of the cap 28 thereby maintaining the rotor assembly and the sleeve in proper relation. The shaft extension 31 carries a pulley 33 from which a driving belt 34 passes to a suitable driving motor (not shown).

To prevent the plug 24 from becoming excessively hot due to heat generated by frictional engagement of the rapidly rotating plug with the rubber stock, the sleeve 26 is provided with an internal passageway 35 through which oil or other suitable coolent may be circulated by means of inlet and outlet conduits 36, 37 which pass through the flange 28 into the passage 35.

For lubricating the rubber stock the shaping die 16 is provided, at the start of the straight portion 23, with a fine annular slit 38 surrounding the extrusion passage and in communication with the outer surface of the plastic. The annular slit 38 is supplied with a continuous stream of liquid lubricant through a lubricating passage 39 leading through the die and connected by means of an external coupling 40 to a lubricant supply line 41. A suitable positive pumping system (not shown) is used to deliver lubricant to the line 41 at a uniform rate.

A threaded cylindrical extension 42 from the front face of the die 16 has threaded thereon a retaining clamp 43 which maintains a flange 44 of the elongated vulcanizing die or tube 17 firmly in place against the face of the extension 42. A vulcanizing passageway 45 of the same cross-sectional size and shape as the straight die passage 23 forms a continuation of the die passage, and is of sufficient length so that the rubber stock, when heated to vulcanizing temperatures, emerges therefrom in a vulcanized state.

For heating the elongated die or tube 17, which is suitably made of an electrically conductive material such as steel, electrical terminals 46 and 47 are provided toward each end of the tube, and the tube is heated to the desired temperature by virture of its resistance to electric current passed therethrough. The heated portion of the tube 17 may be covered with suitable heat insulation 48.

The exit end of the die 17 is provided with a snubber or constriction 49 which insures that sufficient compacting pressure will be developed in the rubber within the die to produce a dense, homogeneous vulcanized product. The vulcanized rubber rod 10 is momentarily deformed to about ½ of its normal cross-sectional area as it passes through the snubber 49, and it thereafter regains the original cross-sectional size imparted to it within the curing chamber 45. Radial bleed holes 50 located just before the snubber 49 permit the escape of lubricant from the passage 45 so that there is no danger of lubricant forming a pocket in the tube and displacing the rubber.

The extrusion head 20 is also provided with the usual rubber bleed passage 51 leading from the extruder passage 15 to the outside of the apparatus.

The operation of the apparatus is as follows:

Vulcanized rubber stock 11 is advanced under the influence of the rotating extruder screw 13 from the extruder barrel 14 and through the passageway 15 in the extruder cross head 20 into the tapered annular passage 22 of the preliminary shaping die 16. The extruder screw is typically rotated at a rate of 12 to 25 R. P. M. The stock is heated to a suitable working temperature, e. g. 200°–250° F., by steam or other heating fluid within the hollow chambers 18 in the extruder walls. The temperatures to which the rubber can safely be heated by such means is limited because of the fact that the stock is heat-sensitive, that is, it is vulcanized, and if it becomes too hot there is danger that it will scorch or prevulcanize within the extrusion passages, with the result that it cannot thereafter be shaped properly, or the finished product will have undesirable physical characteristics. In order to quickly heat the pre-heated rubber stock to vulcanizing temperature, the plug 24 extending into the passage 22 is rotated, through the driving belt 34, the pulley 33 and the drive shafts 31 and 25, at a relatively high rate of speed, for example, 800 R. P. M. The rapid rotation of the plug 24 within the stock 11 causes intense shearing of the stock as it passes through the tapered passageway 22, with the result that the stock is heated by internal friction uniformly throughout its mass in a very brief period of time, e. g. the temperature of the plastic may increase from a temperature of 250° F. in the extruder passage 15 to a temperature of 400° F. in the die passage 22 within ⅕ of a second. A liquid coolant, such as oil, at a temperature of 100°–150° F., is circulated through the passage 35 and through the inlet and outlet conduits 36 and 37 to keep the plug 24 from becoming excessively hot. The rubber stock at a temperature of 400° F., which is vulcanizing temeprature, is passed into the straight die passages 23 and 45, while having a thin film of liquid lubricant, such as paraffin oil, applied to its surface. As the stock advances through the elongated tube 17, usually at a rate of 30 to 75 feet per minute, it is maintained at vulcanizing temperature and emerges as a vulcanized rubber rod 10 of the desired shape.

With the usual plastic stocks, especially vulcanizable rubber stocks, and at the usual extrusion speeds, a smooth-surfaced rotor, such as the rotor 24, revolving at a speed of from 150 to 1000 R. P. M., provides a temperature rise of from about 50° F. to 250° F. in less than one second.

The rotor is preferably smooth-surfaced with the usual highly viscous rubber stocks, so that there will be substantially no tendency for the stock to stick on the rotor and become scorched. However, with relatively low viscosity stocks, it is sometimes found desirable to suitably roughen the surface of the rotor, as by knurling it.

The thickness of the stock between the rotor and the stationary walls of the extrusion passage is preferably kept at the minimum thickness which will permit the stock to pass therethrough at the desired speed with the usual extrusion pressures. As indicated previously, this thickness may be adjusted to a desired value by moving the tapered rotary core axially of the tapered extrusion passage.

The temperature of the coolant applied in proximity to the rotors should be sufficiently high to prevent cooling of the rubber in proximity to the sleeve on which the rotor revolves, and at the same time should be sufficiently low to effect cooling of the rotor. With the apparatus shown, coolant temperatures of 100°–150° F. have been found to give satisfactory results under the usual operating conditions.

From the foregoing it is evident that the invention provides a method of heating a stream of plastic material to a uniformly elevated temperature in a short time by performing mechanical work on the plastic, without danger of overheating the surfaces of the plastic stream. Mechanical energy is converted into heat energy within the plastic mass, so that the heat is, in effect, actually generated within the body of the plastic. If it were attempted to heat a plastic stream to an elevated temperature in a short time by conventional methods, as by heating an extruder body or die with an electrical resistance element, an extremely high surface temperature would have to be applied to the plastic in order to heat the interior of the plastic to any great extent, because of the low heat conductivity and the high viscosity thereof. The application of such high surface temperatures is deleterious to most plastic substances, especially vulcanizable rubber stocks.

Although the present method for heating viscous plastic stocks has been exemplified herein with particular reference to a continuous extrusion operation, the method is also applicable to such discontinuous extrusion operations as injection molding, wherein it is desired to preheat the plastic as it is injected into a shaping mold. The present method is especially suitable for injection molding of thermosetting plastics, which ordinarily cannot be preheated to any great extent by conventional means because of the danger of prematurely setting the plastic.

Because vulcanizable rubber stocks may be heated by the present method to temperatures substantially as high as vulcanizing temperatures without appreciable danger of scorching or prevulcanizing, the present method permits continuous vulcanization to be carried out more rapidly than has heretofore been possible. This is because in the usual continuous vulcanizing process a large portion of the time that the object to be vulcanized spends in the vulcanizer is taken up in gradually raising the temperature of the object to vulcanizing temperature. Typically, half of the time spent in the vulcanizer may be utilized merely to bring the object to vulcanizing temperature. In the present method, the rubber entering the vulcanizing chamber is already heated to vulcanizing temperature and vulcanization proceeds immediately from the time of entrance of the rubber into the vulcanizing zone. Because of this, apparatus of the character illustrated employing a long lubricated vulcanizing die may be operated with a die half the usual length at a given rate of speed, or may be operated at two times the usual speed with a die of given length.

Because of the way coolant liquid is supplied in proximity to the rotor, any tendency of the rotor itself to acquire, by frictional engagement with the stock, an excessively high surface temperature which might scorch the stock is eliminated.

Having thus described my invention, what I claim and desire to protect by Letters Patent is:

1. A method of shaping highly viscous plastic stock which is subject to scorching and heat-curing at elevated temperature comprising in combination the steps of advancing the stock at a temperature sufficiently elevated to render the stock readily workable, but insufficiently elevated to cause scorching of the stock, injecting the said advancing stock through a restricted die orifice into a shaping chamber, and suddenly further heating the stock as the stock passes into the restricted die orifice to produce a substantial sudden rise in the temperature of the stock at the instant that it passes into the said die.

2. A method of shaping highly viscous plastic stock which is subject to scorching and heat-curing at elevated temperature comprising in combination the steps of advancing the stock at a temperature sufficiently elevated to render the stock readily workable, but insufficiently elevated to cause scorching of the stock, injecting the said advancing stock through a restricted die orifice into a shaping chamber, contacting the stock with a moving surface as the stock passes into the said restricted die orifice, the said surface being moved sufficiently rapidly to produce a substantial sudden rise in the temperature of the stock at the instant that it passes into the said die.

3. A method of shaping highly viscous plastic stock which is subject to scorching and heat-curing at elevated temperature comprising in combination the steps of heating the stock at a temperature sufficiently elevated to render it easily workable, but insufficient to scorch or cure the stock, advancing the heated stock under pressure up to and through a relatively restricted die passage, contacting the stock with a rapidly rotating surface at the instant that it passes into the said die passage, the said surface being rotated sufficiently rapidly to suddenly further increase the temperature of the stock substantially to curing temperature, and immediately thereafter passing the thus further heated stock into a shaping chamber to impart a desired shape to the plastic.

4. A method of shaping highly viscous plastic stock which is subject to scorching and vulcanization at definite elevated temperatures, comprising in combination the steps of advancing the stock at a temperature sufficiently elevated to render the stock readily workable, but insufficiently elevated to produce scorching of the stock, passing the said advancing stock through a die orifice into a shaping chamber, rotating a member in contact with the plastic stream at the entrance to the said die at a speed sufficient to raise the temperature of the stock to a much higher temperature than the said first mentioned temperature, and cooling the said rotating member to prevent it from scorching the stock.

5. A method of shaping highly viscous plastic stock which is subject to scorching and vulcanization at definite elevated temperatures comprising in combination the steps of advancing the stock at a temperature sufficiently elevated to render the stock readily workable but insufficiently elevated to produce scorching of the stock, passing the said advancing stock through a die orifice into a shaping chamber, rotating a member in contact with the plastic stream at the entrance to the said die at a speed sufficient to raise the temperature of the stock substantially to vulcanizing temperature at the instant that the stock passes into the die to the said shaping chamber, and vulcanizing the thus heated stock in the said shaping chamber.

6. A method of shaping highly viscous plastic stock which is subject to scorching and vulcanization at definite elevated temperatures comprising in combination the steps of advancing the stock by means of a rotating feeding screw at a temperature sufficiently elevated to render the stock readily workable but insufficiently elevated to produce scorching of the stock, passing the said advancing stock through a die orifice into a shaping chamber, rotating a member independently of said feeding screw in contact with the plastic stream at the entrance to the said die, the speed of said member being greater than the speed of said feeding screw, and being sufficient to raise the temperature of the stock substantially to vulcanizing temperature at the instant that the stock passes into the die to the said shaping chamber, and vulcanizing the thus heated stock in the said shaping chamber.

7. An apparatus for shaping highly viscous and heat-sensitive plastic stocks comprising in combination an extruder body, said extruder body being provided with heating means for heating plastic stock within the extruder body to working temperature, an extrusion screw rotatably mounted in said extruder body for very gradual rotation to advance the stock through said extruder body, a transverse cross head secured to the delivery end of said extruder body, a die member mounted in said cross head, a stationary supporting sleeve extending within said head axially of the said die into proximity to the entrance of the die, a rotary head mounted at the end of said sleeve immediately adjacent to the entrance to said die and coaxial therewith for high speed rotation to generate intense and sudden heating within the plastic at the instant that the plastic streams into said die under the influence of said extrusion screw, the said rotary head being frustro-conical and having a substantial length in comparison with its maximum diameter, and the said rotary head being in addition to and separate from said rotary screw, said stationary supporting sleeve having an internal passage for circulating cooling fluid therethrough to prevent said rotary head and the portions of the supporting sleeve adjacent thereto from becoming excessively hot, and a shaping chamber mounted at the delivery end of said die for receiving the thus intensely heated plastic.

References Cited in the file of this patent

UNITED STATES PATENTS

| 902,850 | Auchu | Nov. 3, 1908 |
| 1,364,549 | Gordon | Jan. 4, 1921 |
| 1,535,191 | Kaiser et al. | Apr. 14, 1925 |
| 2,465,482 | Rhodes | Mar. 29, 1949 |
| 2,541,201 | Buecken et al. | Feb. 13, 1951 |
| 2,620,515 | Olson | Dec. 9, 1952 |

FOREIGN PATENTS

| 598,176 | Germany | June 6, 1934 |